UNITED STATES PATENT OFFICE.

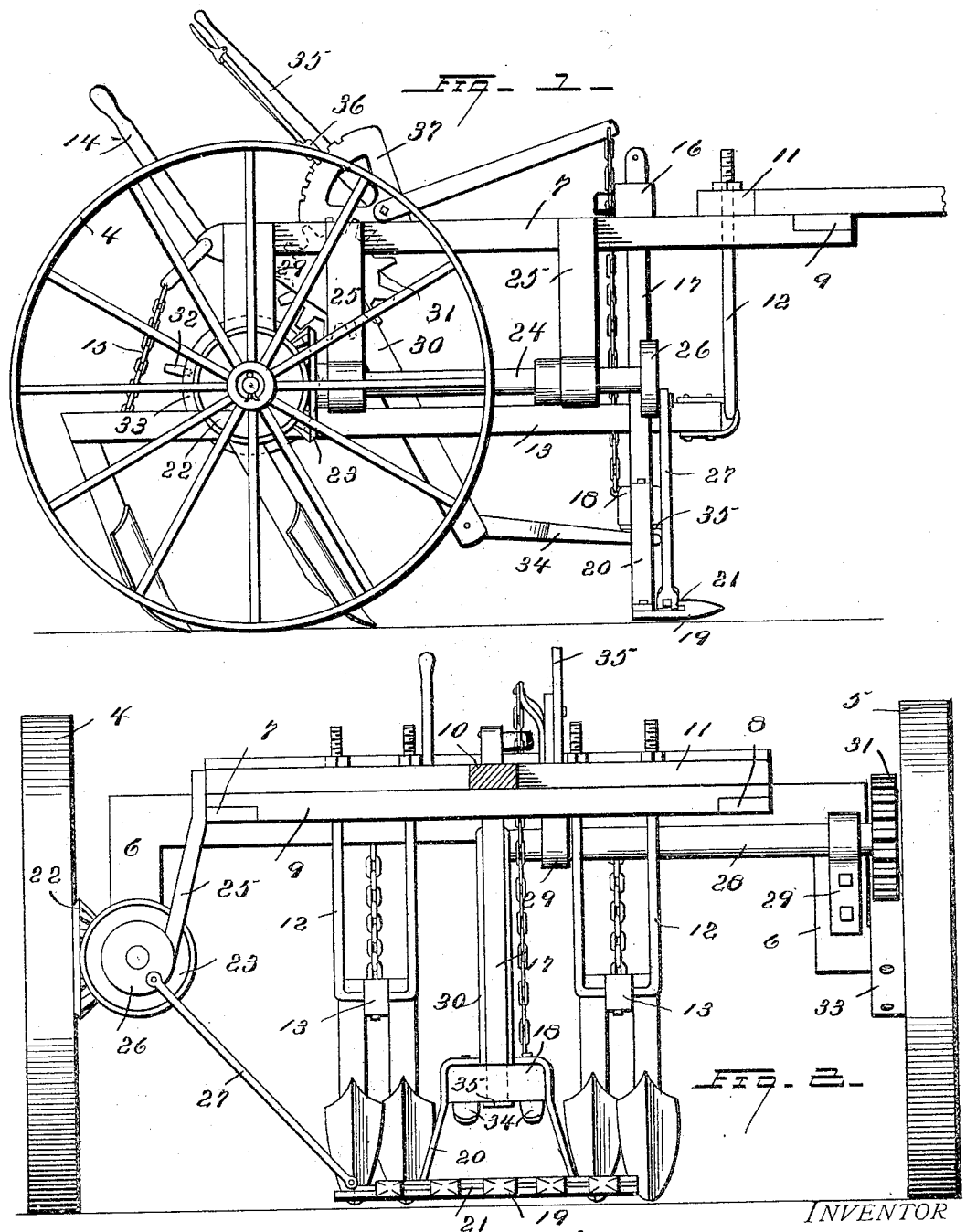

GEORGE GIPSON COLDIRON, OF ALEXANDER, TEXAS.

COTTON-CHOPPER.

No. 802,073.   Specification of Letters Patent.   Patented Oct. 17, 1905.

Application filed July 24, 1905. Serial No. 271,124.

*To all whom it may concern:*

Be it known that I, GEORGE GIPSON COLDIRON, a citizen of the United States, residing at Alexander, in the county of Erath and State of Texas, have invented new and useful Improvements in Cotton-Choppers, of which the following is a specification.

My invention is a cotton-chopper, and has for its object certain novel features of construction hereinafter described and claimed.

The invention comprises a wheeled frame carrying a horizontally-reciprocating cutter-bar which is raised and lowered at intervals while in operation.

In the accompanying drawings, Figure 1 is a side elevation, and Fig 2 is a front elevation, of the machine.

Referring specifically to the drawings, 4 and 5 denote the wheels, which are carried on an arched axle 6. The supporting-frame for the cutting mechanism extends forwardly from the axle and comprises spaced beams 7 and 8, respectively, joined in front by a cross-beam 9. The draft-tongue 10 is secured to the beam 9.

Near the front end of the supporting-frame is a cross-beam 11, carrying depending frames 12, on which the front ends of the cultivator-beams 13 are pivotally supported. The cultivator-beams are raised and lowered by a hand-lever 14, having a flexible connection 15 with the rear ends of said beams.

Behind the beam 11 is a cross-beam 16, to which is secured a depending stem 17, on which a block 18 is slidably mounted. The block 18 carries the finger-bar 19, the latter being secured to the block by straps 20. The finger-bar is provided with a cutter-bar 21, which is reciprocated horizontally by a gearing from the wheel 4. Said gearing comprises a bevel-gear 22, secured to said wheel and meshing with a bevel-gear 23 on a shaft 24, supported in bearings 25, carried by the beam 7. The shaft 24 has a crank-disk 26 connected by a pitman 27 with the cutter-bar.

It will be understood that when the machine is drawn over the rows of cotton-plants the cutter-bars will be reciprocated, as in a mowing-machine. However, means must be provided for rendering the cutter inoperative at intervals in order that the plants may be left in "stands." This is done by elevating the cutting mechanism at intervals, according to the distance desired between the stands.

The means for elevating the cutting mechanism comprises a rock-shaft 28, mounted in bearings 29 on the axle 6 and having at one end a crank-arm 30. The opposite end of the rock-shaft is fitted with a toothed wheel 31, arranged to be engaged by tappets 32, extending from a disk 33, made fast to the wheel 5, so as to rotate therewith. At the outer end of the crank-arm 30 is a fork-shaped member 34, extending under the block 18. When the tappets 32 strike the toothed wheel 31, the shaft 28 is rocked, causing the crank-arm 30 to swing upwardly and the member 34 to lift the block 18 and slide it upwardly on the stem 17, thus elevating the cutting mechanism carried by said block above the plant. The stem 17 is made square or angular to prevent rotation of the block thereon, thus holding the cutting mechanism in proper alinement with the driving means. When the tappets pass the toothed wheel, the parts drop down by gravity and the cutting mechanism is restored to its normal position for operating on the plants. At the bottom of the stem 17 are outwardly-extending flanges 35 to prevent the block 18 from dropping off said stem.

The distance between the stands is readily regulated by fitting the disk 33 with more or less tappets. The periphery of the disk is provided with a number of threaded sockets into which the tappets are screwed, they being provided with threaded stems for this purpose. By removing the tappets the lifting mechanism is rendered inoperative, which may be desirable in going to and from the field. Manually-operated means for elevating the cutting mechanism are also provided and comprise a hand-lever 35, connected thereto. The hand-lever is fulcrumed at any convenient place on the frame of the machine and is provided with the usual locking device comprising a spring-latch 36, engaging the toothed section 37.

Having thus described my invention, what is claimed as new, and desired to be secured by Letters Patent, is—

1. In a cotton-chopper; the combination with a wheeled frame; a wheel-operated longitudinally-reciprocating cutter-bar carried thereby; and wheel-operated means for intermittently elevating the cutter-bar.

2. In a cotton-chopper; the combination with a wheeled frame; a depending stem carried by the frame; a block slidably mounted on the stem, and carrying a wheel-operated longitudinally - reciprocating cutter; and wheel-operated means for intermittently sliding the block upwardly on the stem.

3. In a cotton-chopper; the combination with a wheeled frame; a wheel-operated longitudinally-reciprocating cutter-bar carried thereby; a rock-shaft; a wheel-operated tappet for actuating the rock-shaft; and means carried by the rock-shaft for intermittently elevating the cutter-bar.

4. In a cotton-chopper; the combination with a wheeled frame; a depending stem carried by the frame; a block slidably mounted on the stem, and carrying a wheel-operated longitudinally - reciprocating cutter - bar; a rock-shaft; a wheel-operated tappet for actuating the rock-shaft; and means carried by the rock-shaft, and engaging the block for intermittently sliding the same upwardly on the stem.

In testimony whereof I have signed my name to this specification in the presence of two subscribing witnesses.

GEORGE GIPSON COLDIRON.

Witnesses:
J. M. HOUSE,
W. R. McCLELLAN.